US012603219B2

(12) United States Patent
Moon et al.

(10) Patent No.: US 12,603,219 B2
(45) Date of Patent: Apr. 14, 2026

(54) COIL COMPONENT

(71) Applicant: SAMSUNG ELECTRO-MECHANICS CO., LTD., Suwon-si (KR)

(72) Inventors: Byeong Cheol Moon, Suwon-si (KR); Han Lee, Suwon-si (KR); Boum Seock Kim, Suwon-si (KR); Sang Jin Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 630 days.

(21) Appl. No.: 18/090,019

(22) Filed: Dec. 28, 2022

(65) Prior Publication Data

US 2024/0006115 A1 Jan. 4, 2024

(30) Foreign Application Priority Data

Jun. 30, 2022 (KR) ........................ 10-2022-0080361

(51) Int. Cl.
*H01F 27/29* (2006.01)
*H01F 27/28* (2006.01)

(52) U.S. Cl.
CPC ....... *H01F 27/292* (2013.01); *H01F 27/2804* (2013.01); *H01F 2027/2809* (2013.01)

(58) Field of Classification Search
CPC ............... H01F 27/292; H01F 27/2804; H01F 2027/2809
See application file for complete search history.

(56) References Cited

U.S. PATENT DOCUMENTS 4,016,519 A * 4/1977 Haas .................. H01F 27/2804 336/200
2003/0179067 A1* 9/2003 Gamou ............... H01F 27/2804 336/223
(Continued)

FOREIGN PATENT DOCUMENTS

EP 1085538 A1 * 3/2001 ............. H01F 27/28
KR 10-2001-0067177 A 7/2001
(Continued)

OTHER PUBLICATIONS

Korean Office Action dated Feb. 12, 2026 issued in Korean Patent Application No. 10-2022-0080361 (with English translation).

*Primary Examiner* — Malcolm Barnes
(74) *Attorney, Agent, or Firm* — Morgan Lewis & Bockius LLP

(57) ABSTRACT

A coil component includes a body, a substrate, a first coil, a second coil, a plurality of conductive vias connecting an innermost turn of the first coil and an innermost turn of the second coil to each other, a first external electrode connected to one end of the first coil, and a second external electrode connected to one end of the second coil, wherein the innermost turn of the first coil includes a first region having a line width, narrower than a line width of an adjacent outer turn, and the innermost turn of the second coil includes a second region having a line width, narrower than a line width of an adjacent outer turn, and at least one of the plurality of conductive vias is connected to the first region, and at least one of the other conductive vias is connected to the second region.

15 Claims, 6 Drawing Sheets

(56) References Cited

U.S. PATENT DOCUMENTS

| | | | | |
|---|---|---|---|---|
| 2013/0300529 | A1* | 11/2013 | Chang | H01F 27/292 336/200 |
| 2014/0152118 | A1* | 6/2014 | Kim | H01F 27/2847 307/104 |
| 2015/0340149 | A1* | 11/2015 | Lee | H05K 1/111 336/200 |
| 2017/0228721 | A1* | 8/2017 | Lee | H04B 5/26 |
| 2018/0033539 | A1 | 2/2018 | Yoon et al. | |
| 2019/0013145 | A1* | 1/2019 | Ohkubo | H01F 17/04 |
| 2019/0109373 | A1* | 4/2019 | Ahn | H01F 38/14 |
| 2020/0168386 | A1 | 5/2020 | Jung et al. | |

FOREIGN PATENT DOCUMENTS

| | | | |
|---|---|---|---|
| KR | 10-2012-0055253 | A | 5/2012 |
| KR | 10-2018-0012620 | A | 2/2018 |
| KR | 10-2019-0040642 | A | 4/2019 |
| KR | 10-2020-0062748 | A | 6/2020 |

* cited by examiner

COIL COMPONENT

CROSS-REFERENCE TO RELATED APPLICATION(S)

This application claims the benefit of priority to Korean Patent Application No. 10-2022-0080361 filed on Jun. 30, 2022 in the Korean Intellectual Property Office, the disclosure of which is incorporated herein by reference in its entirety.

TECHNICAL FIELD

The present disclosure relates to a coil component having an inductor array structure.

BACKGROUND

With the miniaturization and slimming of electronic devices such as digital TVs, mobile phones, laptop PCs, and the like, there has been increasing demand for the miniaturization and thinning of coil components used in such electronic devices. To satisfy such demand, research and development of various winding type or thin film type coil components have been actively conducted.

A main issue depending on the miniaturization and thinning of the coil component is to maintain characteristics of an existing coil component in spite of the miniaturization and thinning thereof. To satisfy such demand, a ratio of a magnetic material should be increased in a core in which the magnetic material is filled. However, there is a limitation in increasing the ratio due to a change in strength of an inductor body of an inductor, frequency characteristics depending on insulation properties of the inductor body, and the like.

A miniaturized thin-film type power inductor includes a conductive via for electrical connection between coil layers. A via pad having a line width, wider than a line width of an end portion of an innermost turn of a coil pattern, is formed to secure alignment between the conductive via and a coil. However, in this case, a size of a core may be insufficiently secured due to an area of the via pad, and thus, magnetic properties of a coil component may be deteriorated.

SUMMARY

An aspect of the present disclosure is to implement a coil component, advantageous for miniaturization and having improved characteristics by sufficiently securing a size of a core.

According to an aspect of the present disclosure, a coil component includes: a body, a substrate disposed within the body, a first coil disposed on a first surface of the substrate and having a plurality of turns, a second coil disposed on a second surface of the substrate and having a plurality of turns, a plurality of conductive vias connecting an innermost turn of the first coil and an innermost turn of the second coil to each other, a first external electrode disposed on the body to be connected to a first end of the first coil, and a second external electrode disposed on the body to be connected to a first end of the second coil. The innermost turn of the first coil includes a first region having a line width, narrower than a line width of an adjacent outer turn, and the innermost turn of the second coil includes a second region having a line width, narrower than a line width of an adjacent outer turn. At least one of the plurality of conductive vias is connected to the first region, and at least one of a remainder of conductive vias is connected to the second region.

A line width of the first region in the innermost turn of the first coil may be less than or equal to half of a line width of an outer turn adjacent to the innermost turn of the first coil.

A line width of the second region in the innermost turn of the second coil may be less than or equal to half of a line width of an outer turn adjacent to the innermost turn of the second coil.

Among the plurality of conductive vias, one conductive via may be connected to a second end of the first coil and another conductive via may be connected to a second end of the second coil.

The second end of the first coil may have a line width, narrower than a line width of one region of the second coil connected to the second end of the first coil by the conductive via.

The second end of the second coil may have a line width, narrower than a line width of one region of the first region connected to the second end of the second coil by the conductive via.

At least one of the plurality of conductive vias may be disposed between a conductive via connected to the second end of the first coil and a conductive via connected to the second end of the second coil.

The plurality of conductive vias may be disposed at regular intervals.

More than ¼ turn may be formed from the second end of the first coil to the second end of the second coil when viewed in a direction, perpendicular to the first surface and the second surface of the substrate.

More than ½ turn may be formed from the second end of the first coil to the second end of the second coil when viewed in a direction, perpendicular to the first surface and the second surface of the substrate.

The first region may have a uniform line width on the innermost turn of the first coil.

The second region may have a uniform line width on the innermost turn of the second coil.

The plurality of conductive vias may penetrate through the substrate.

The substrate may have a through-hole formed in a region corresponding to a core of each of the first and second coils.

A portion of the body may fill the through-hole of the substrate.

BRIEF DESCRIPTION OF DRAWINGS

The above and other aspects, features, and advantages of the present disclosure will be more clearly understood from the following detailed description, taken in conjunction with the accompanying drawings.

DETAILED DESCRIPTION

Figure 1:
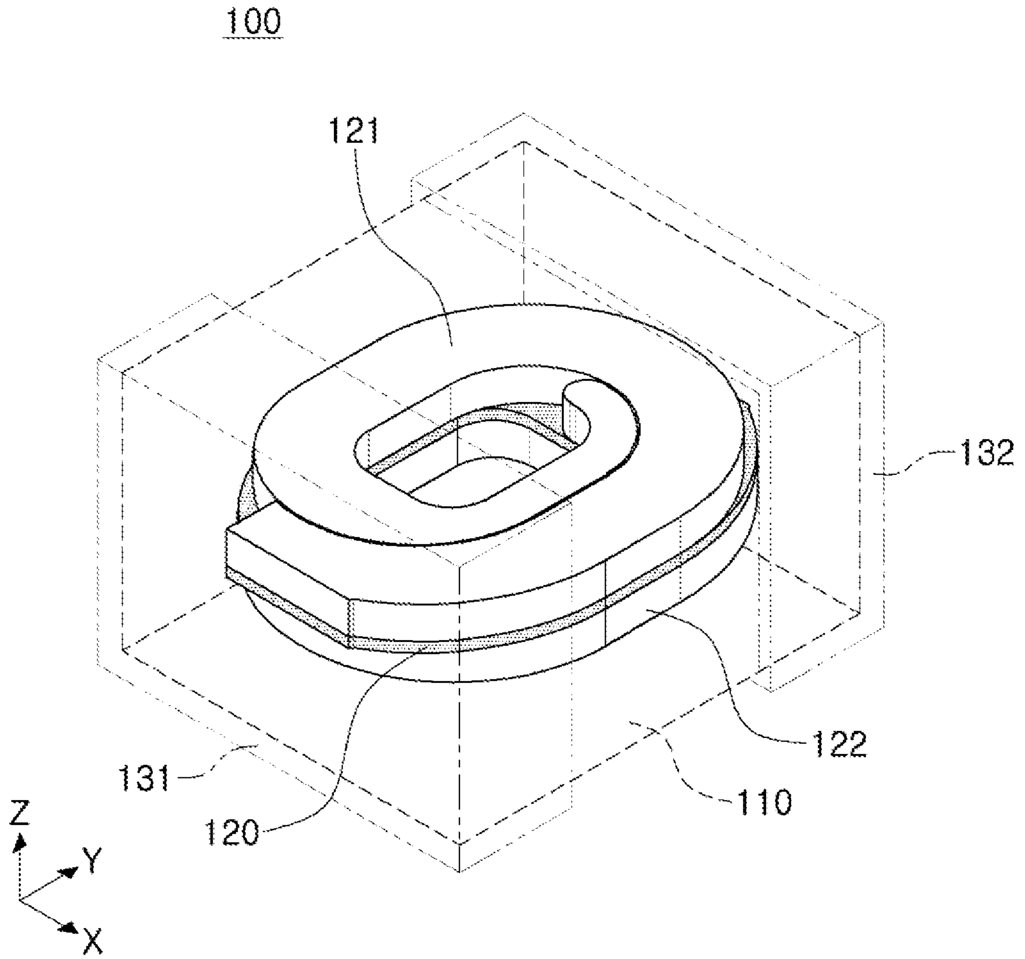
FIG. 1 is a schematic perspective view illustrating a coil component according to an exemplary embodiment of the present disclosure.

Hereinafter, embodiments in the present disclosure will be described as follows with reference to the attached drawings. The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Various types of coil components may be appropriately used between electronic components to remove noise, or the like. For example, a coil component in an electronic device may be used as a power inductor, a high-frequency (HF) inductor, a general bead, a bead for a high frequency (GHz), a common mode filter, and the like.

Figure 2:
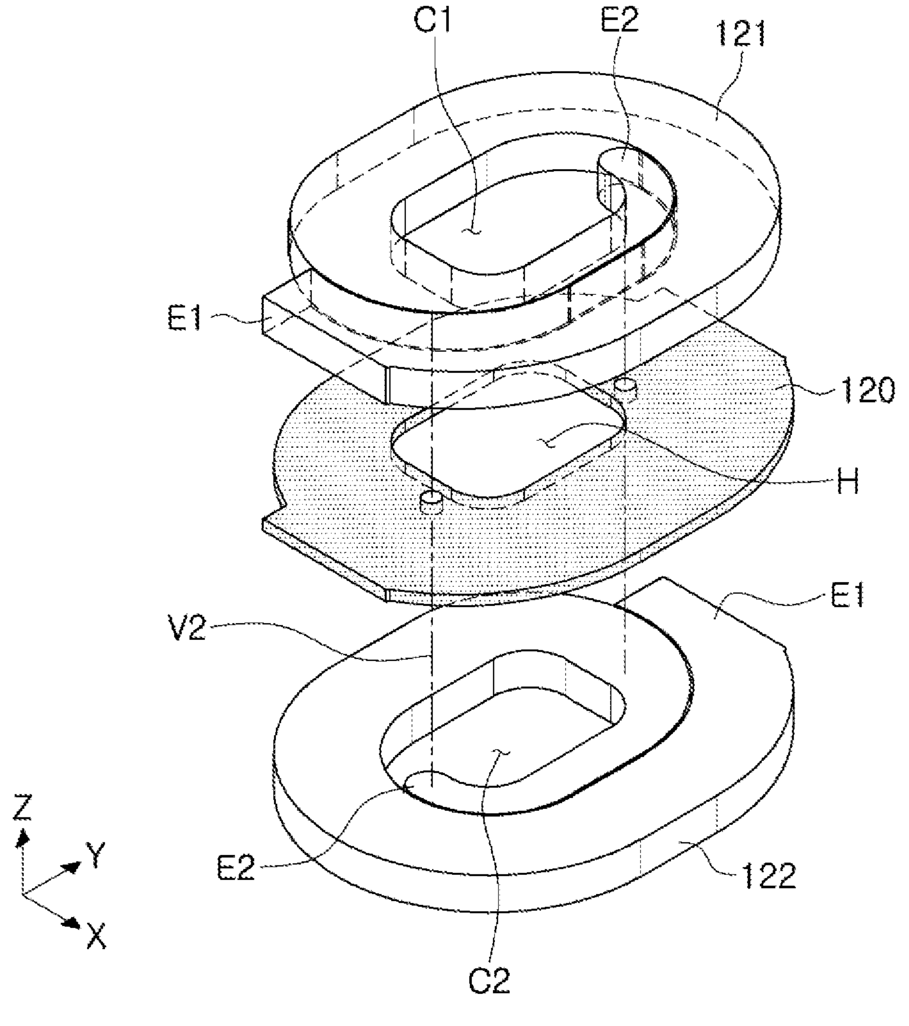
FIG. 2 is an exploded perspective view illustrating first and second coils and a substrate in the coil component of FIG. 1.
Figure 3:
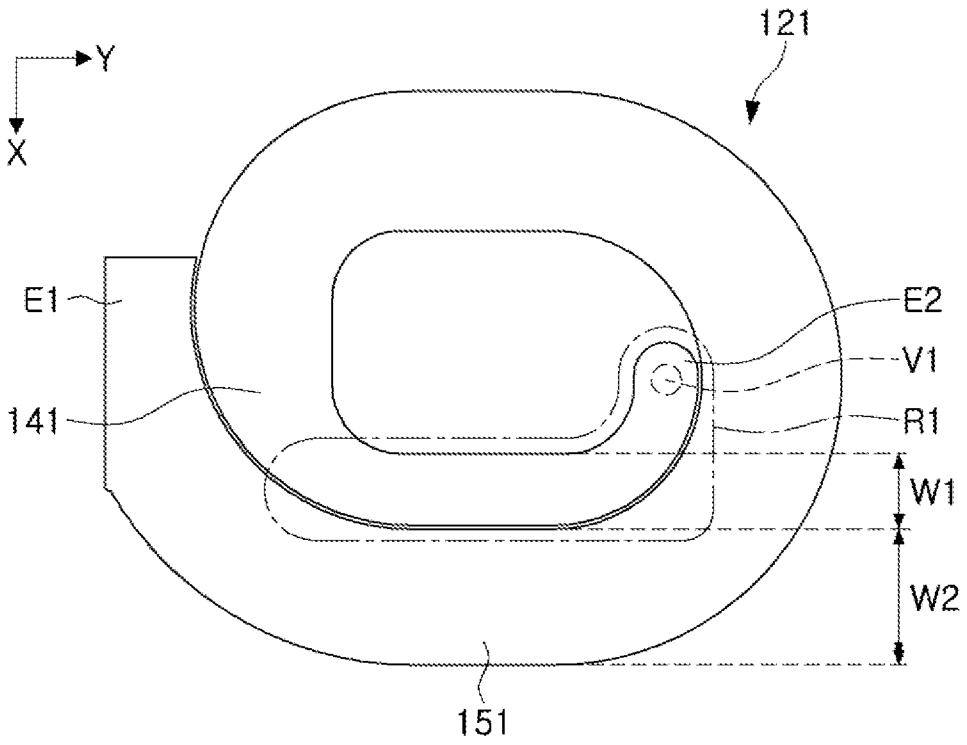
FIG. 3 is a plan view illustrating a first coil in the coil component of FIG. 1.
Figure 4:
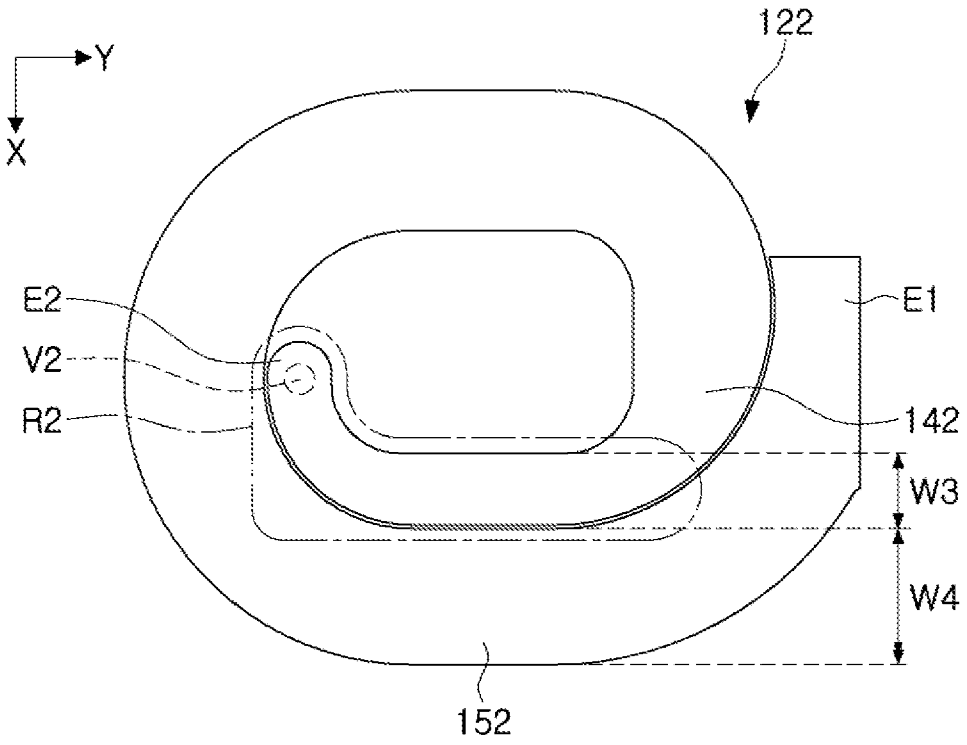
FIG. 4 is a plan view illustrating a second coil in the coil component of FIG. 1.
Figure 5:
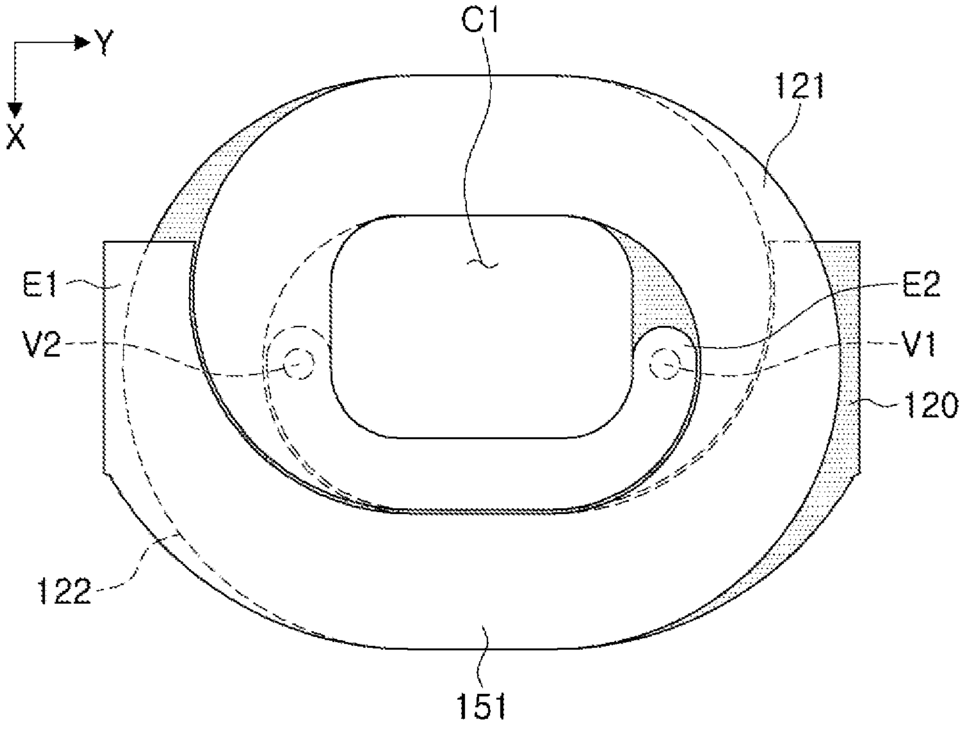
FIG. 5 is a plan view illustrating first and second coils and a substrate in the coil component of FIG. 1.

FIG. 1 is a schematic perspective view illustrating a coil component according to an exemplary embodiment. FIG. 2 is an exploded perspective view illustrating first and second coils and a substrate in the coil component of FIG. 1. FIG. 3 is a plan view illustrating a first coil in the coil component of FIG. 1, and FIG. 4 is a plan view illustrating a second coil in the coil component of FIG. 1. FIG. 5 is a plan view illustrating first and second coils and a substrate in the coil component of FIG. 1.

Referring to FIGS. 1 to 4, the coil component 100 according to the present embodiment may include a body 110, a substrate 120, a first coil 121, a second coil 122, and a plurality of conductive vias V1 and V2, a first external electrode 131, and a second external electrode 132. An innermost turn 141 of the first coil 121 may include a first region R1 having a line width W1, narrower than a line width of an adjacent outer turn 151, and an innermost turn 142 of the second coil 122 may include a second region R2 having a line width W3, narrower than a line width of an adjacent outer turn 152. Among the plurality of conductive vias V1 and V2, at least one via V1 may be connected to the first region R1 and at least one via V2 may be connected to the second region R2. Due to such a structure, the structural and electrical connectivity of the first and second coils 121 and 122 may be improved. Furthermore, sizes of the cores C1 and C2 may be sufficiently secured to improve magnetic properties (for example, $L_s$ and $I_{sat}$ properties) of the coil component 100. Hereinafter, main components constituting the coil component 100 according to the present embodiment will be described.

The body 110 may form an exterior of the coil component 100, and the coils 121 and 122 and the substrate 120 may disposed within the body 110. As illustrated in the drawings, the body 110 may be formed to have a substantially hexahedral shape. For example, in some embodiments, edges and/or corners of the body 100 may be rounded based on tolerances in the manufacturing process, and/or to avoid concentration of stresses at sharp edges and/or corners.

As an example, the body 110 may be formed such that a coil component 100 according to the present embodiment, in which the external electrodes 131 and 132 are formed, has a length of 2.5 mm, a width of 2.0 mm, and a thickness of 1.0 mm, or a thickness of 2.0 mm, a length of 1.2 mm, and a width of 0.65 mm, or a length of 1.6 mm, a width of 0.8 mm, and a thickness of 0.8 mm, or a length of 1.0 mm, a width of 0.5 mm, and a thickness of 0.5 mm, or a length of 0.8 mm, a width of 0.4 mm and a thickness of 0.65 mm, but exemplary embodiments are not limited thereto. The above-mentioned numerical values are merely numerical values in design which do not reflect process errors, and thus, it should be appreciated that dimensions within a range admitted as a process error fall within the scope of the present disclosure.

Based on an optical microscope or a scanning electron microscope (SEM) image for a cross-section in a first direction (an X-direction)-a third direction (a Z-direction) in a central portion of the coil component 100 in the first direction (the X-direction), a length of the coil component 100 in the first direction (the X-direction) may refer to a maximum value, among dimensions of a plurality of segments parallel to the first direction (the X-direction) when two outermost boundary lines of the coil component 100 illustrated in the image of the cross-section are connected to each other. Alternatively, the length of the coil component 100 in the first direction (the X-direction) may refer to a minimum value, among dimensions of a plurality of segments facing each other in the first direction (the X-direction) when two outermost boundary lines, parallel to each other in the first direction (the X-direction), of the coil component 100 illustrated in the image of the cross-section are connected to each other. Alternatively, the length of the coil component 100 in the first direction (the X-direction) may refer to an arithmetic mean value of at least three of the plurality of segments parallel to the first direction (the X-direction) when two outermost boundary lines, parallel to each other in the first direction (the X-direction), of the coil component 100 illustrated in the image of the cross-section are connected to each other. A plurality of segments, parallel to the first direction (the X-direction), may be equally spaced apart from each other in the third direction (the Z-direction), but the scope of the present invention is not limited thereto.

Based on an optical microscope or a scanning electron microscope (SEM) image for a cross-section in a first direction (an X-direction)-a second direction (a Y-direction) in a central portion of the coil component 100 in the second direction (the Y-direction), a length of the coil component 100 in the second direction (the Y-direction) may refer to a maximum value, among dimensions of a plurality of segments parallel to the second direction (the Y-direction) when two outermost boundary lines of the coil component 100 illustrated in the image of the cross-section are connected to each other. Alternatively, the length of the coil component 100 in the second direction (the Y-direction) may refer to a minimum value, among dimensions of a plurality of segments facing each other in the second direction (the Y-direction) when two outermost boundary lines, parallel to each other in the second direction (the Y-direction), of the coil component 100 illustrated in the image of the cross-section are connected to each other. Alternatively, the length of the coil component 100 in the second direction (the Y-direction) may refer to an arithmetic mean value of at least three of the plurality of segments parallel to the second direction (the Y-direction) when two outermost boundary lines, parallel to each other in the second direction (the Y-direction), of the coil component 100 illustrated in the image of the cross-section are connected to each other. A plurality of segments, parallel to the second direction (the Y-direction), may be equally spaced apart from each other in the first direction (the X-direction), but the scope of the present invention is not limited thereto.

Based on an optical microscope or a scanning electron microscope (SEM) image for a cross-section in a first direction (an X-direction)-a third direction (a Z-direction) in a central portion of the coil component 100 in the third direction (the Z-direction), a length of the coil component 100 in the third direction (the Z-direction) may refer to a maximum value, among dimensions of a plurality of segments parallel to the third direction (the Z-direction) when two outermost boundary lines of the coil component 100 illustrated in the image of the cross-section are connected to each other. Alternatively, the length of the coil component 100 in the third direction (the Z-direction) may refer to a minimum value, among dimensions of a plurality of segments facing each other in the third direction (the Z-direction) when two outermost boundary lines, parallel to each other in the third direction (the Z-direction), of the coil component 100 illustrated in the image of the cross-section are connected to each other. Alternatively, the length of the coil component 100 in the third direction (the Z-direction) may refer to an arithmetic mean value of at least three of the plurality of segments parallel to the third direction (the Z-direction) when two outermost boundary lines, parallel to each other in the third direction (the Z-direction), of the coil component 100 illustrated in the image of the cross-section are connected to each other. A plurality of segments, parallel to the third direction (the Z-direction), may be equally spaced apart from each other in the first direction (the X-direction), but the scope of the present invention is not limited thereto.

Alternatively, each of the lengths of the coil component 100 in the first to third directions may be measured by a micrometer measurement method. In the micrometer measurement method, measurement may be performed by setting a zero (0) point using a micrometer (instrument) with gage repeatability and reproducibility (R&R), inserting the coil component 100 between tips of the micrometer, and turning a measurement lever of the micrometer. When the length of the coil component 100 is measured by a micrometer measurement method, the length of the coil component 100 may refer to a value measured once or an arithmetic mean of values measured two or more times.

The body 110 may include an insulating resin and a magnetic material. For example, the body 110 may be formed by laminating one or more magnetic composite sheets in which a magnetic material is dispersed in an insulating resin. The magnetic material may be, for example, a ferrite powder particle or a magnetic metal powder particle. Examples of the ferrite powder particle may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites. The magnetic metal powder particle may include one or more selected from the group consisting of iron (Fe), silicon (Si), chromium (Cr), cobalt (Co), molybdenum (Mo), aluminum (Al), niobium (Nb), copper (Cu), and nickel (Ni) For example, the magnetic metal powder particle may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder. The metallic magnetic material may be amorphous or crystalline. For example, the magnetic metal powder particle may be a Fe—Si—B—Cr-based amorphous alloy powder, but exemplary embodiments are not limited thereto. Each of the ferrite powder and the magnetic metal powder particle may have an average diameter of about 0.1 μm to 30 μm, but exemplary embodiments are not limited thereto. The body 110 may include two or more types of magnetic materials dispersed in a resin. In this case, the term "different types of magnetic material" means that the magnetic materials dispersed in the resin are distinguished from each other by average diameter, composition, crystallinity, and a shape. The following description will be provided on the premise that the magnetic material is magnetic metal powder particles, but the scope of the present disclosure is not limited to the body 110 having a structure in which magnetic metal powder particles are dispersed in an insulating resin. The insulating resin may include epoxy, polyimide, liquid crystal polymer, or the like, in a single form or in combined forms, but exemplary embodiments are not limited thereto.

The substrate 120 may be disposed in the body 110 to support the coils 121 and 122, and may be formed as, for example, a polypropylene glycol (PPG) substrate, a ferrite substrate, or a metal-based soft magnetic substrate. As illustrated in the drawings, a through-hole H may be formed in a portion of the substrate 120. For example, the through-hole H may be formed in a region corresponding to the cores C1 and C2 of the first and second coils 121 and 122, and a material constituting the body 110 may fill the through-hole H.

As a detailed example, the substrate 120 may be formed of a thermosetting insulating resin such as an epoxy resin, a thermoplastic insulating resin such as a polyimide resin, or an insulating material including a photosensitive insulating resin, or may be formed of an insulating material in which a reinforcement such as glass fiber or an inorganic filler is impregnated in the above-mentioned insulating materials. As a more detailed example, the substrate 120 may be formed of an insulating material such as prepreg, Ajinomoto build-up film (ABF), FR-4, bismaleimide triazine (BT), a photoimageable dielectric (PID), or the like, but an example of the material may not be limited thereto. As the inorganic filler, at least one element selected from the group consisting of silica ($SiO_2$), aluminum oxide ($Al_2O_3$), silicon carbide (SiC), barium sulfate ($BaSO_4$), talc, mud, mica power, aluminum hydroxide ($AlOH_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the substrate 120 is formed of an insulating material including a reinforcing material, the substrate 120 may provide more excellent rigidity. When the substrate 120 is formed of an insulating material including reinforcement, the substrate 120 may provide more improved rigidity. When the insulating substrate 120 is formed of an insulating material which does not include glass fiber, it may be advantageous for thinning of the coil component 100. In addition, based on the body 110 having the same size, a volume occupied by the coils 121 and 122 and/or the magnetic metal powder particles may be increased to improve component characteristics. When the substrate 120 is formed of an insulating material including a photosensitive insulating resin, the number of processes of forming the coils 121 and 121 may be decreased, and thus, it may be advantageous for reduction of production costs and the conductive vias V1 and V2 may be formed to be fine. The thickness of the substrate 120 may be, for example, 10 μm or more to 50 μm or less, but exemplary embodiments are not limited thereto.

The first coil 121 may be disposed on a first surface S1 of the substrate 120, and may have a plurality of turns. The second coil 122 may be disposed on a second surface S2 of the substrate 120, and may have a plurality of turns. The first and second coils 121 and 122 may serve to perform various functions in an electronic device through characteristics exhibited from a coil of the coil component 100. For example, the coil component 100 may be a power inductor. In this case, the first and second coils 121 and 122 may store energy in the form of a magnetic field to maintain an output voltage to stabilize power.

The first and second coils 121 and 122 may be connected by a plurality of conductive vias V1 and V2. To this end, the plurality of conductive vias V1 and V2 may penetrate through the substrate 120. The first and second coils 121 and 122 may be formed using a plating process used in the art, for example, pattern plating, anisotropic plating, isotropic plating, and the like, and may be formed to have a multilayer structure using a plurality of processes, among the above-mentioned processes.

Figure 6:
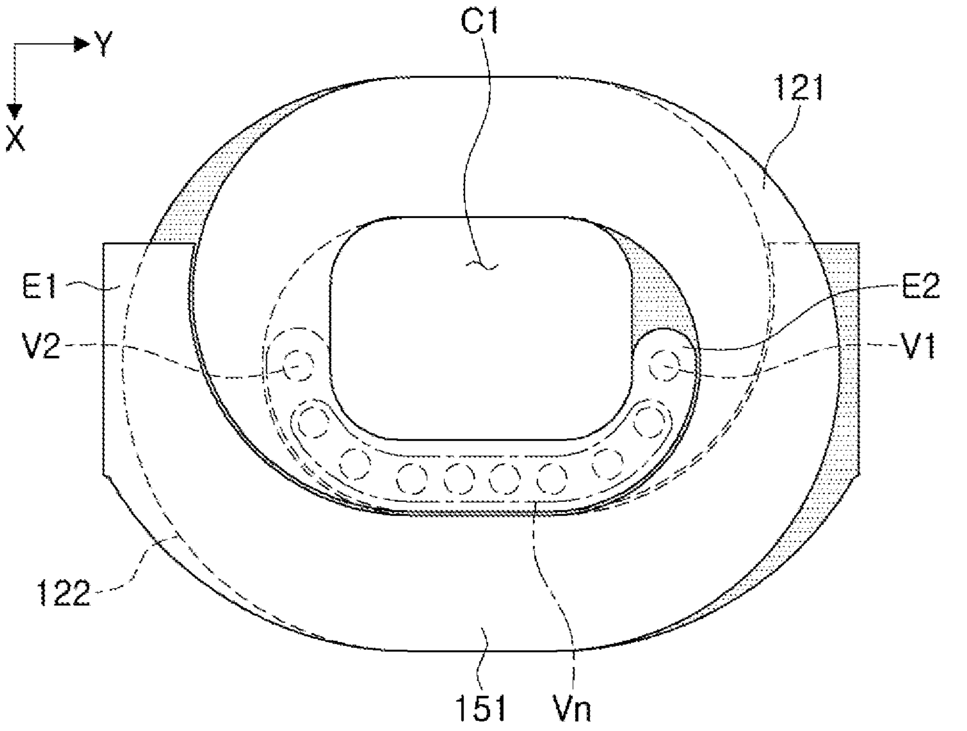
FIGS. 6 to 9 are diagrams illustrating coil components according to modified examples.

A method of connecting the first and second coils 121 and 122 and the plurality of conductive vias V1 and V2 will now be described in detail. The plurality of conductive vias V1 and V2 may connect an innermost turn 141 of the first coil 121 and an innermost turn 142 of the second coil 122 to each other. As an example, among the plurality of conductive vias V1 and V2, a first via V1 may be connected to the second end E2 of the first coil 121 and the second via V2 may be connected to the second end E2 of the second coil 122. In this case, first end E1 of the first coil 121 may correspond to a lead-out portion connected to the first external electrode 131, and the second end E2 thereof may be present in the innermost turn 141. For example, in the first coil 121, a line width W1 of the first region R1 may be narrower than a line width W2 of the outer turn 151, and the conductive via V1 may be connected to the first region R1. According to an exemplary embodiment, more than one conductive via V1 may be connected to the first region R1. Similarly, the first end E1 of the second coil 122 may correspond to a lead-out portion connected to the second external electrode 132, and the second end E2 thereof may be present in the innermost turn 142. For example, in the second coil 122, a line width W3 of the second region R2 may be narrower than a line width W4 of the outer turn 152, and the conductive via V2 may be connected to the second region R2. According to an exemplary embodiment, more than one conductive via V2 may be connected to the second region R2. As in the modified example of FIG. 6, among a plurality of conductive vias, one or more conductive vias Vn may be connected between the via V1 connected to the second end E2 of the first coil 121 and the via V2 connected to the second end E2 of the second coil 122. In this case, the plurality of conductive vias V1, V2, and Vn may be disposed at regular intervals. As in the present modified example, $R_{dc}$ of the coil component 100 may be further reduced by increasing the number of conductive vias V1, V2, and Vn to three or more.

Returning to the exemplary embodiment of FIG. 1, when the first and second coils 121 and 122 are connected through a plurality of conductive vias V1 and V2 as in the present embodiment, a parallel connection structure may be implemented in the first and second regions R1 and R2 to improve electrical characteristics, for example, $R_{dc}$ characteristics (to reduce $R_{dc}$). Furthermore, in the present embodiment, the regions R1 and R2 having relatively narrow line widths W1 and W3 may be disposed in the innermost turns 141 and 142 of the first and second coils 121 and 122, and thus, sizes of the cores C1 and C2 may be sufficiently secured. As an example, the second end E2 of the first coil 121 may have a line width, narrower than a line width of a region of the second coil 122 connected thereto by the conductive via V1, for example, a region facing in the third direction (the Z-direction). Similarly, the second end E2 of the second coil 122 may have a line width, narrower than a line width of a region of the first coil 121 connected thereto by the conductive via V2, for example, a region facing in the third direction (the Z-direction). When the line widths W1 and W3 of the first and second regions R1 and R2 are relatively narrow, the $R_{dc}$ characteristics of the first and second coils 121 and 122 may be deteriorated ($R_{dc}$ may be increased). As described above, the parallel connection structure may be formed in the first and second regions R1 and R2, so that an increase in $R_{dc}$ may be effectively suppressed.

Figure 7:
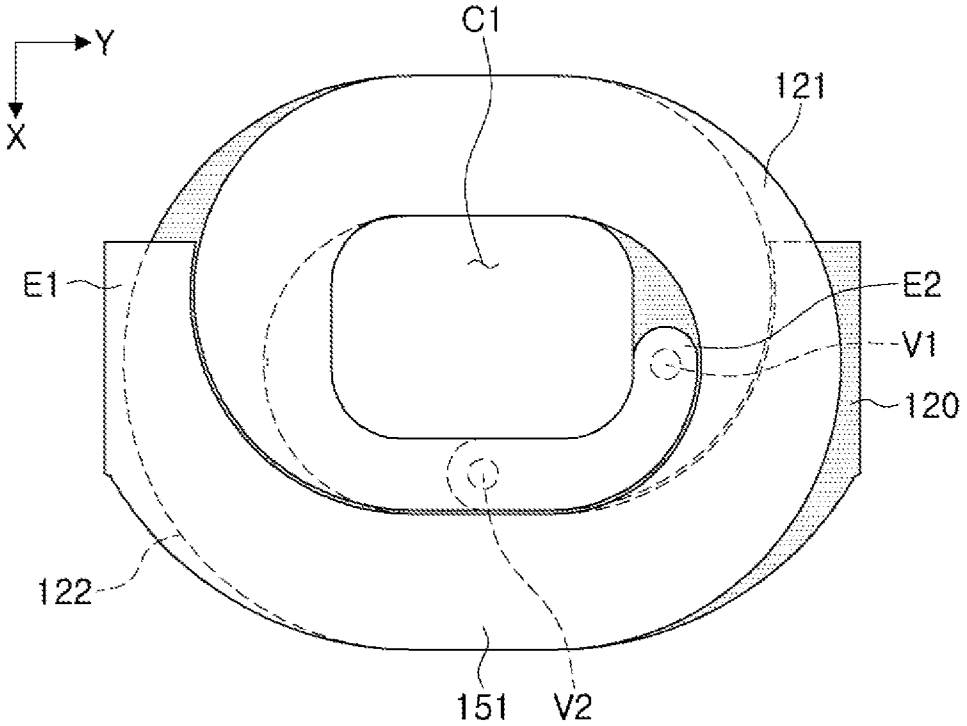
Figure 8:
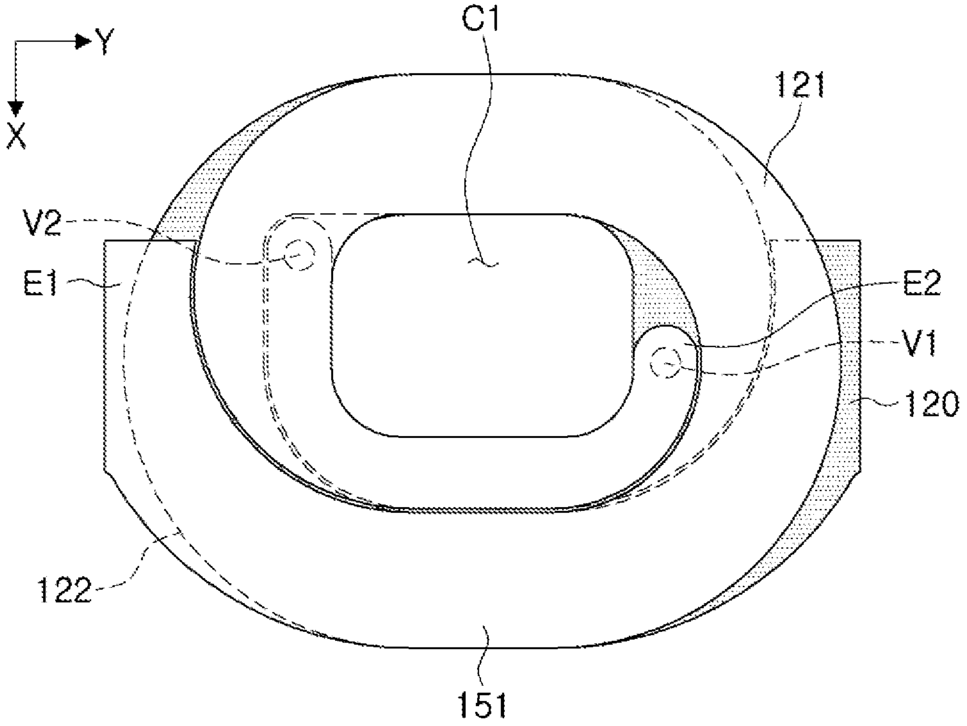
Figure 9:
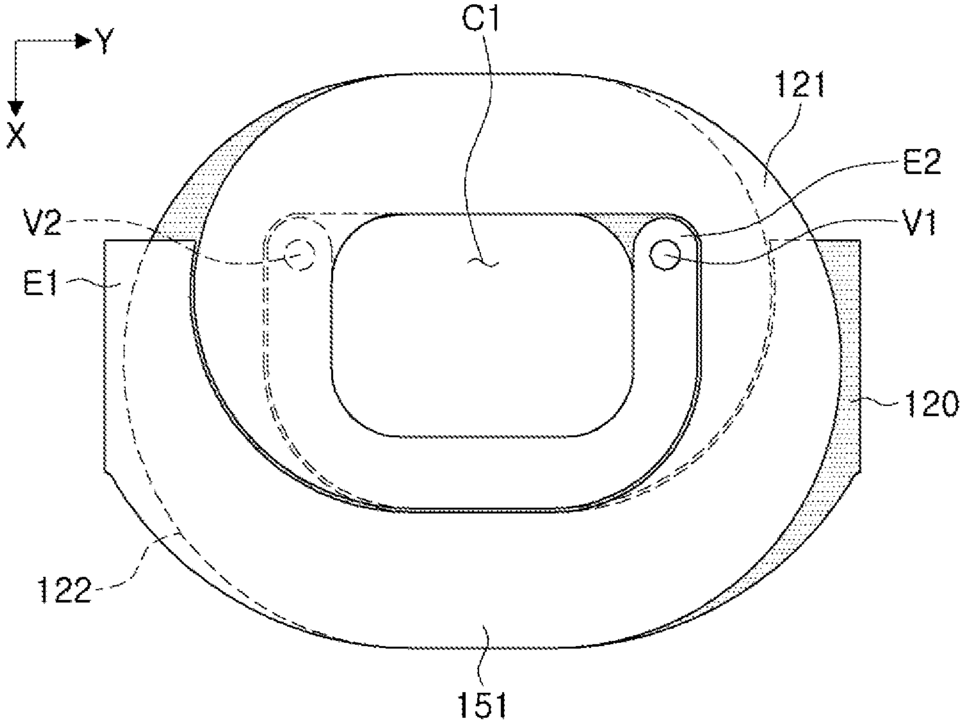

The line width W1 of the first region R1 in the innermost turn 141 of the first coil 121 may be less than or equal to half of the line width W2 of the outer turn 151 adjacent thereto. Thus, the cores C1 and C2 may sufficiently expand. Similarly, the line width W3 of the second region R2 in the innermost turn 142 of the second coil 122 may be less than or equal to half of the line width W4 of the outer turn 152 adjacent thereto. In addition, the line width W1 of the first region R1 in the innermost turn 141 of the first coil 121 may be uniform. Similarly, the line width W3 of the second region R2 in the innermost turn 142 of the second coil 122 may be uniform. In addition, an overlapping length of the first and second regions R1 and R2 may be determined in consideration of the above-described $R_{dc}$ reduction effect. For example, ¼ turn or more may be formed from the second end E2 of the first coil 121 to the second end E2 of the second coil 122 when viewed in a direction perpendicular to the first surface S1 and the second surface S2 of the substrate 120 (the Z-direction with respect to FIG. 1), and FIG. 5 illustrates a case corresponding to about ½ turn. In the case of the modified example of FIG. 7, about ¼ turn may be formed from the second end E2 of the first coil 121 to the second end E2 of the second coil 122. In the case of the modified example of FIGS. 8 and 9, more than ½ turn may be formed from the second end E2 of the first coil 121 to the second end E2 of the second coil 122. FIG. 8 illustrates a case in which about ⅝ turn is formed, and FIG. 9 illustrates a case in which about ¾ turn is formed.

Returning to FIG. 1, the first and second external electrodes 131 and 132 may be formed on external sides of the body 110 to be connected to the first and second lead-out portions A1 and A2. The first and second external electrodes 131 and 132 may be formed using a paste containing a metal having improved electrical conductivity, for example, nickel (Ni), copper (Cu), tin (Sn), or silver (Ag), or alloys thereof. A plating layer may be further formed on each of the first and second external electrodes 131 and 132. In this case, the plating layer may include at least one selected from the group consisting of nickel (Ni), copper (Cu), and tin (Sn). For example, the plating layer may include a nickel (Ni) layer and a tin (Sn) layer sequentially formed.

Figure 10:
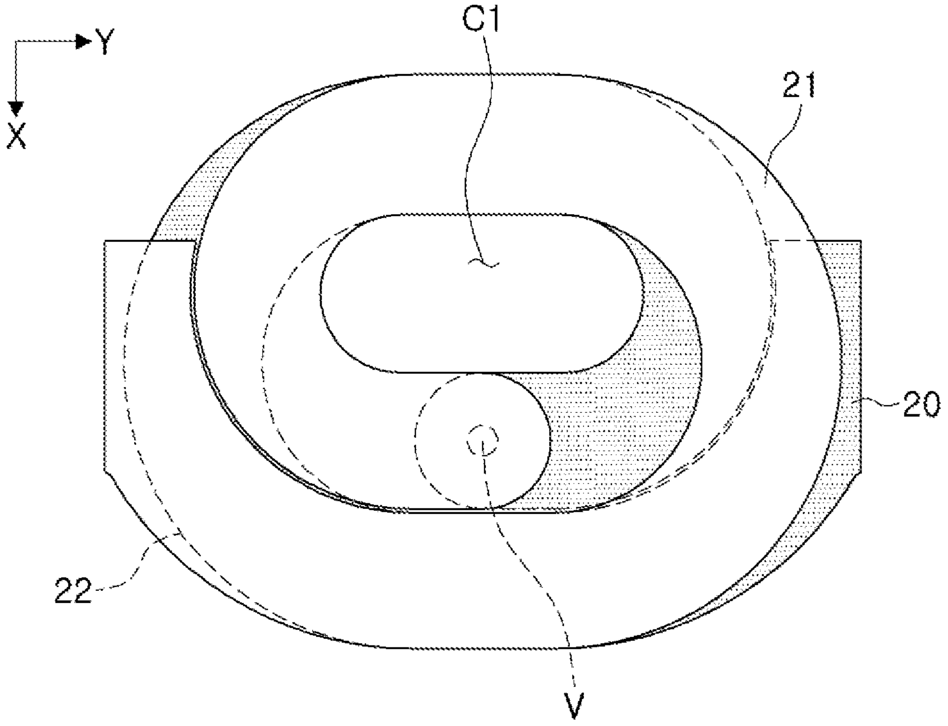
FIG. 10 is a diagram illustrating a coil component according to a comparative example.

The present inventors simulated performance of the coil component according to Embodiments and Comparative Example, and results thereof are listed in Table 1. The coil component had a 2520 size, for example, a length of the coil component in an X-direction was 2.5 mm, a length of the coil component in a Y-direction was 2.0 mm, and a length of the coil component in a Z-direction was 1.2 mm, and as characteristics of the coil component, a core area, an inductance characteristic $L_s$, a DC resistance characteristic $R_{dc}$, and saturation current characteristic $I_{sat}$ were measured. Embodiment 1 has the structure illustrated in FIG. 5, and Embodiment 2 has the structure illustrated in FIG. 6. For example, Embodiments 1 and 2 are different in the number of conductive vias. Comparative Example has the structure illustrated in FIG. 10, in which the first and second coils 21 and 22 are formed on a first surface and a second surface of the substrate 20 and, unlike Embodiments, a width of the innermost turn is the same as a width of the outer turn. In addition, a single conductive via V is employed and connects the first and second coils 21 and 22 to each other. In Embodiments, line widths of the first and second regions of the innermost turn were set to be 226 μm, and line widths of the adjacent outer turn were set to be 452 μm.

TABLE 1

| | Comparative Example | First Embodiment | Second Embodiment |
|---|---|---|---|
| Core Area (mm$^2$) | 0.519 | 0.749 | 0.749 |
| $L_s$ (μF) | 0.101 | 0.112 | 0.112 |
| $R_{dc}$ (mΩ) | 2.739 | 2.618 | 2.529 |
| $I_{sat}$ (A) | 16.8 | 18.14 | 18.13 |

From the experimental results of Table 1, it can be seen that in the case of Example 1, a core size was increased by 40% or more as compared with Comparative Example, and accordingly, $L_s$ was increased by about 10.7%, $R_{dc}$ was decreased by about 4.4%, and $I_{sat}$ was increased by about 8.0%. It can also be seen that, when a conductive via was additionally employed as in Embodiment 2, the $R_{dc}$ characteristic was further improved to be reduced by about 7.7%.

As described above, a coil component, advantageous for miniaturization and having improved characteristics by sufficiently securing a size of a core, may be implemented.

While example embodiments have been shown and described above, it will be apparent to those skilled in the art that modifications and variations could be made without departing from the scope of the present invention as defined by the appended claims.

What is claimed is:

1. A coil component comprising:
a body;
a substrate disposed within the body;
a first coil disposed on a first surface of the substrate and having a plurality of turns including an innermost turn having a first region with a line width narrower than a line width of an adjacent outer turn;
a second coil disposed on a second surface of the substrate and having a plurality of turns including an innermost turn having a second region with a line width narrower than a line width of an adjacent outer turn;
a plurality of conductive vias connecting an innermost turn of the first coil and an innermost turn of the second coil to each other, at least one of the plurality of conductive vias being connected to the first region, at least one of a remainder of the plurality of conductive vias being connected to the second region;
a first external electrode disposed on the body to be connected to a first end of the first coil; and
a second external electrode disposed on the body to be connected to a first end of the second coil.

2. The coil component of claim 1, wherein
the line width of the first region is less than or equal to half of the line width of the adjacent outer turn.

3. The coil component of claim 1, wherein
the line width of the second region is less than or equal to half of the line width of the adjacent outer turn.

4. The coil component of claim 1, wherein
among the plurality of conductive vias, one conductive via is connected to a second end of the first coil and another conductive via is connected to a second end of the second coil.

5. The coil component of claim 4, wherein
the second end of the first coil has a line width, narrower than a line width of a first region of the second coil connected to a second end of the first coil by the conductive via.

6. The coil component of claim 4, wherein the second end of the second coil has a line width, narrower than a line width of the second region of the first region connected to a second end of the second coil by the conductive via.

7. The coil component of claim 4, wherein at least one of the plurality of conductive vias is disposed between a conductive via connected to the second end of the first coil and a conductive via connected to the second end of the second coil.

8. The coil component of claim 7, wherein the plurality of conductive vias are disposed at regular intervals.

9. The coil component of claim 1, wherein equal to or more than ¼ turn is formed from a second end of the first coil to a second end of the second coil when viewed in a direction perpendicular to the first surface and the second surface of the substrate.

10. The coil component of claim 1, wherein equal to or more than ½ turn is formed from a second end of the first coil to a second end of the second coil when viewed in a direction perpendicular to the first surface and the second surface of the substrate.

11. The coil component of claim 1, wherein the first region has a uniform line width on the innermost turn of the first coil.

12. The coil component of claim 1, wherein the second region has a uniform line width on the innermost turn of the second coil.

13. The coil component of claim 1, wherein the plurality of conductive vias penetrates through the substrate.

14. The coil component of claim 1, wherein the substrate has a through-hole formed in a region corresponding to a core of each of the first and second coils.

15. The coil component of claim 14, wherein a portion of the body fills the through-hole of the substrate.

* * * * *